United States Patent [19]

Yokoyama et al.

[11] Patent Number: 4,933,432
[45] Date of Patent: Jun. 12, 1990

[54] METHOD OF REDUCING DIMETHYL POLYSILOXANE REMAINING IN SILICONE RUBBER PRODUCTS TO THE ULTRA-MICRO LEVEL

[75] Inventors: Shigeyoshi Yokoyama; Kazuhisa Takagi, both of Saitama, Japan

[73] Assignee: Kabushiki Kaisha Asahi Rubber, Saitama, Japan

[21] Appl. No.: 221,469

[22] Filed: Jul. 19, 1988

[30] Foreign Application Priority Data

Jul. 31, 1987 [JP] Japan .................................. 62-191690

[51] Int. Cl.$^5$ ........................ C08F 6/10; B01D 33/06
[52] U.S. Cl. .................................. 528/498; 528/491;
528/502; 528/10; 210/748; 210/770; 210/784;
210/805
[58] Field of Search ............... 210/748, 770, 784, 805;
528/33, 10, 491, 498, 502

[56] References Cited

U.S. PATENT DOCUMENTS 3,327,401 6/1967 Stamos ................................. 210/748
3,713,540 1/1973 Davidson ............................ 210/748

FOREIGN PATENT DOCUMENTS 0009687 4/1980 European Pat. Off. .
1915427 10/1970 Fed. Rep. of Germany .
0707623 4/1954 United Kingdom .

Primary Examiner—John C. Bleutge
Assistant Examiner—Ralph H. Dean, Jr.
Attorney, Agent, or Firm—Young & Thompson

[57] ABSTRACT

A method is provided for the reduction of the level of dimethyl polysilioxane remaining in a silicone rubber product containing said dimethyl polysiloxane to an ultra-micro level, comprising the steps of immersing the silicone rubber product in an organic solvent for the dimethyl polysiloxane and subjecting the immersed product to ultrasonic vibrations in the organic solvent.

19 Claims, 8 Drawing Sheets

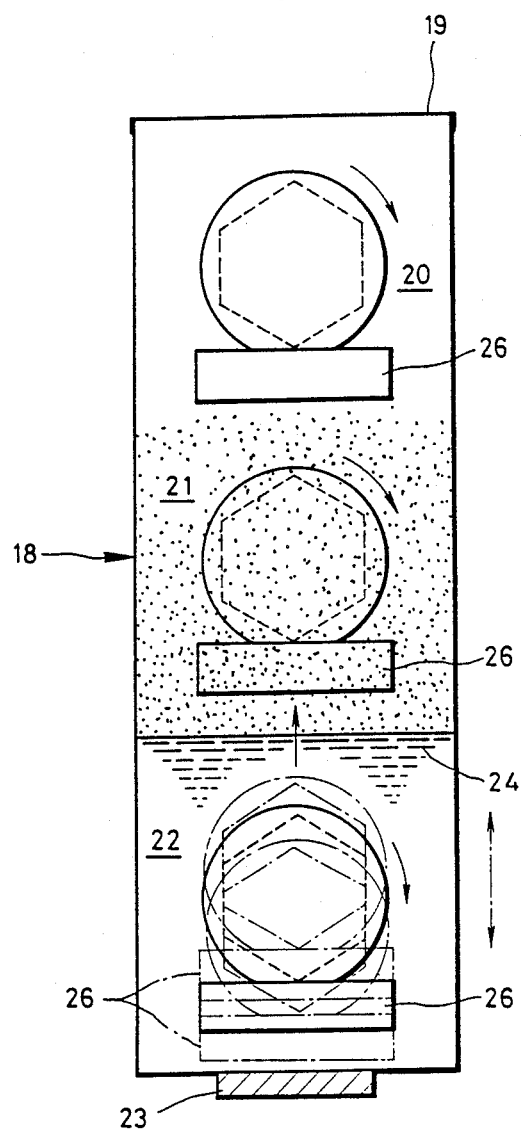

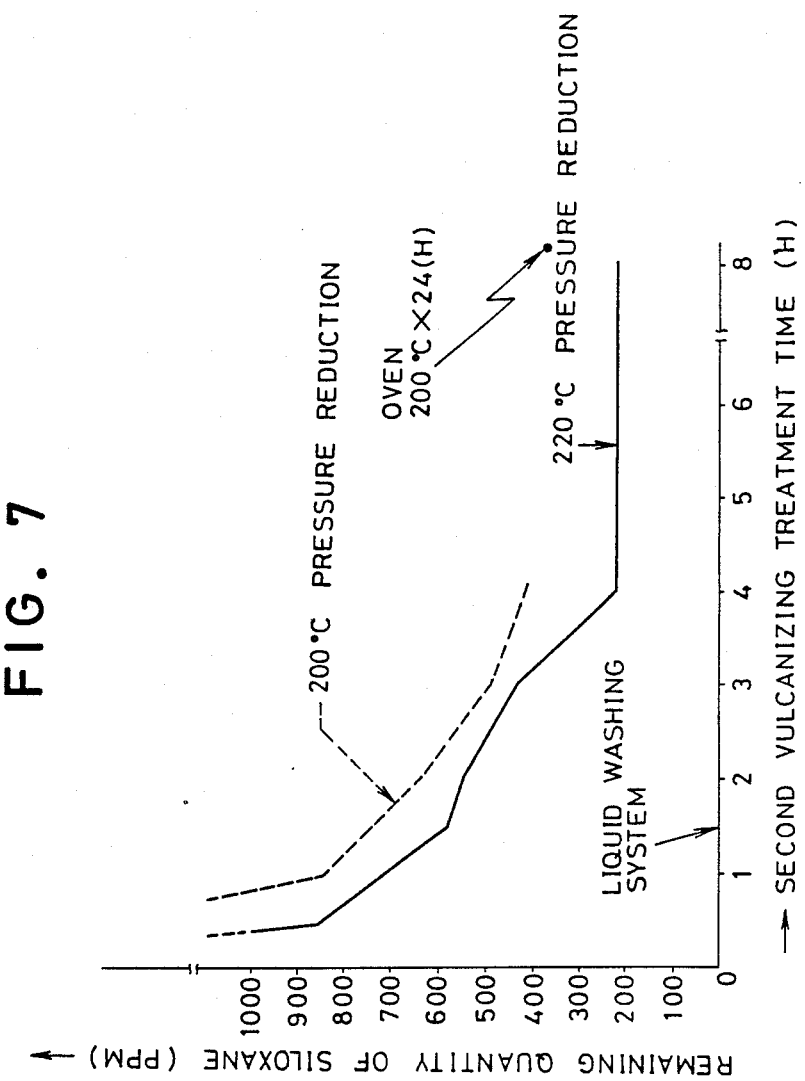

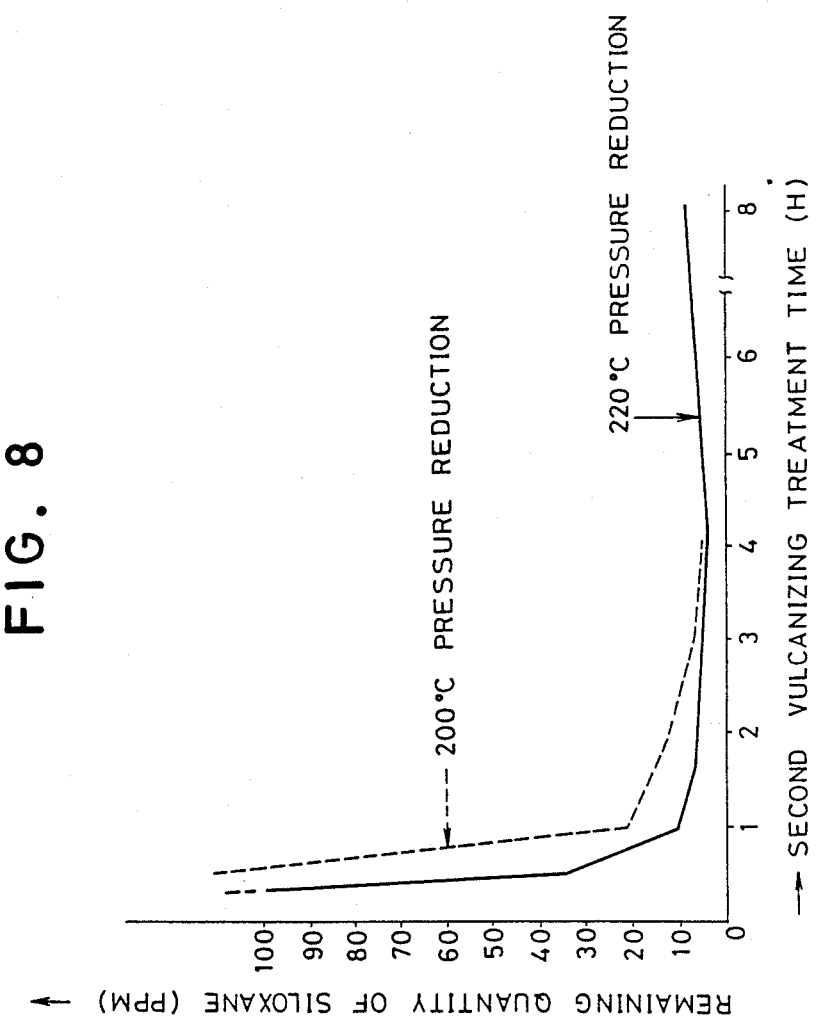

METHOD OF REDUCING DIMETHYL POLYSILOXANE REMAINING IN SILICONE RUBBER PRODUCTS TO THE ULTRA-MICRO LEVEL

BACKGROUND OF THE INVENTION

The present invention relates to a method of reducing the level of cyclic dimethyl polysiloxane and low molecular weight dimethyl polysiloxane (referred to as "dimethyl polysiloxane" in the following description) which, for example, remain in a silicone tube, color cap or the like (referred to as "silicone rubber product" in the following description) which generate a silicon gas. More particularly, the present invention relates to a new method of reducing dimethyl polysiloxane to an ultra-micro level, which enables the level of dimethyl polysiloxane to be reduced to an ultra-micro level in a very short time and at a high efficiency by performing an ultrasonic treatment while immersing the silicone rubber product in an organic solvent while under agitation.

Silicone rubber products have been utilized in many fields for structures which undergo extremes of temperature, such as automobiles, aircraft, electric appliances or the like. Especially, although electronic circuits are small sized and integrated as well as improved in reliability, the relays, switches or the like used with these circuits are also small sized to employ a low force of contact. Contact hindrance of metal contacts of the relay and switch are almost always due to bad contact. The main factors causing bad contacts are dust and harmful gas (for example, corrosive gas and organic gas). The harmful gas is classified into corrosive gases present in the atmosphere, such as hydrogen sulfide, sulfur dioxide, ammonia gas or the like and organic gases which are generated from precursor materials such as silicone compounds, adhesives or the like (e.g., construction materials of instruments). It has been already reported that the gas generated particularly from silicone rubber products has a remarkably undesirable influence on metallic contacts (see, for example, "Quality Control", Vol. 27, No. 11, pages 70–76, 1976; "Influence of Gas Generated from Si Rubber to Metallic Contacts" by Takeshi Aoki (Nippon Telegraph and Telephone Public Corporation) and Hiroshi Oikawa (Yokosuka Electric Communication Institute) in "EMC - 79–42", pages 23–29, 1979).

Silicone rubber is generally synthesized by using cyclic dimethyl polysiloxanes comprised primarily of polysiloxanes of the formula $[(CH_3)_2 SiO]_{4-6}$ in order to form via ring opening polymerization a silicone rubber high polymer. However, other dimethyl siloxanes defined by the formula $[(CH_3)_2 SiO]_{3-25}$ are present in the reaction mixture and may not enter into the polymerization process.

It has been already made clear from the aforementioned documents that the source generating the silicone gas is a cyclic dimethyl polysiloxane and a low molecular weight dimethyl polysiloxane remaining in the silicone rubber product as unreacted residual components.

Such unreacted dimethyl polysiloxane is generally treated at a temperature of 200° C. for 4–24 hours by means of a treatment method which includes a second vulcanizing stage subsequent to a normal vulcanizing (forming) step being performed, for example, by means of a hot air circulating dryer. Also, in a treatment method using a vacuum dryer, the amount of dimethyl polysiloxane present may be reduced by treatment at a temperature of 200° C. for about 1–4 hours.

However, large quantities of dimethyl polysiloxane remain subsequent to either of the above treatment methods using the hot air circulating drying system or the treatment method using the vacuum drying system, regardless of the length of time of the treatment performed. Also, the treatment time is long, and the products contained in the treatment reservoir during the treatment contact each other as well as the treatment reservoir. Further, the treatment varies because it is very difficult to maintain a uniform temperature distribution in the dryer. Problems thus result with regard to the quality of the product produced as well as productivity.

The inventors have diligently attempted to provide a method to reduce the amount of dimethyl polysiloxane remaining in the silicone rubber product which product exhibits excellent heat resistance, cold resistance, ozone resistance, electric insulation or the like, and as a result of this, have succeeded in developing a novel method of reducing the amount of dimethyl polysiloxane remaining in the silicone rubber product to an ultra-micro level over a very short time and with high efficiency.

OBJECT AND SUMMARY OF THE INVENTION

It is an object of the present invention to provide a method of reducing the amount of dimethyl polysiloxane remaining in silicone rubber products to an ultra-micro level making it possible to reduce the amount of dimethyl polysiloxane remaining in the silicone rubber product to an ultra-micro level over a short time and with high efficiency.

In order to solve the problems mentioned above and in accordance with the above object, a method for reducing the amount of dimethyl polysiloxane remaining in silicone rubber products to an ultra-micro level is provided, comprising the steps of immersing said silicone rubber product containing residual dimethyl siloxane in an organic solvent for the dimethyl polysiloxane and subjecting said product immersed in said solvent to ultrasonic vibration in said organic solvent in order to extract said dimethyl polysiloxane by action of the solvent.

The amount of dimethyl polysiloxane remaining in the silicone rubber product is accordingly reduced to an ultramicro level by means of the following steps.

The silicone rubber product to be so treated is contained, for example, in a treatment reservoir. The treatment reservoir containing the silicone rubber is initially heated by means of infrared irradiation as a preliminary treatment. The silicone rubber product contained in the treatment reservoir is uniformly irradiated with infrared irradiation while being rotated so as to heat treat the product. By this, a majority of the low boiling point fractions of the dimethyl polysiloxane remaining in the silicone rubber product may be removed. As a result, about 80–90% of the total amount of the dimethyl polysiloxane may be removed.

The treatment reservoir upon termination of the initial treatment is advanced in a treatment box and displaced from an upper portion to a lower portion of the treatment box by means of a first lift means and further, is transferred to a first feed means. The treatment reservoir is transferred to an upper portion of a wash treatment tank by means of first feed means. At this time, a second lift means which operates vertically in the wash treatment tank is caused to be raised to an open portion (or access port) of the wash treatment tank to receive the treatment reservoir being transferred there. In this case, a second feed means is transferred to a portion of a first infrared drying treatment tank to enable the treatment reservoir to be placed into and removed therefrom. Similarly, a third feed means is transferred to a portion of a second infrared drying treatment tank to enable the treatment reservoir to be placed into and removed therefrom. Further, a fourth feed means is transferred to a discharge section. The first to fourth feed means are reciprocated simultaneously by means of a cross feed cylinder.

When the second lift means receives the transferred treatment reservoir at the access port of the wash treatment tank, the second lift means drops into the wash treatment tank and the treatment reservoir is transferred to an ultrasonic wash chamber formed in the lowermost portion of the wash treatment tank. At this time, the treatment reservoir supported on the second lift means is fully immersed in an organic solvent in the ultrasonic wash chamber. The immersed treatment reservoir is rotated on the second lift means by means of a rotation means and vertical reciprocation means enables the reservoir to be moved up and down in the organic solvent while being rotated. At this time, ultrasonic wave energy is applied to the organic solvent by means of an ultrasonic oscillator present in the ultrasonic wash chamber.

As a result, an infinite number of ultra-fine cavitation bubbles are formed in the solvent. The cavitation bubbles are formed by oscillations resulting from the use of both multiple and high frequencies. Acceleration of molecular vibration in the solvent becomes very large and cavitation proceeds between a high pressure and a high vacuum, whereby residual substances and deposits are destroyed and refined. In addition to this, the organic solvent and the silicone rubber product are uniformly contacted due to the rotation and vertical reciprocating movement of the treatment reservoir. Accordingly, direct contact does not occur between adjacent silicone rubber products and between the latter and the treatment reservoir. Further, when the silicone rubber product is immersed in the organic solvent, after about 4–5 minutes it swells to a cubic volume three times that before immersion. If the aforementioned rotation and the vertical oscillation movement are applied to such a swollen silicone rubber product, an infinite number of ultra-fine cavitation bubbles are caused to advance more efficiently. Therefore, the dimethyl polysiloxane remaining in the silicone rubber product is extracted in the organic solvent over a short time and with high efficiency.

By raising the second lift means, the treatment reservoir is removed from the organic solvent and then transferred to a shower and vapor washing chamber in the wash treatment tank to subject same to a shower and vapor washing. In this washing chamber, almost all of the sprayed vapors are evaporated.

Then, by further raising the second lift means, the treatment reservoir is brought into a treatment chamber in the wash treatment tank which uses dry air as a treatment medium. During the treatment stages using the shower and vapor and the dry air, the treatment reservoir is subjected to the respective treatments while being rotated on the second lift means. At this time, the first feed means is brought to the access port of the wash treatment tank.

The treatment reservoir is transferred to a starting position of the second feed means by the raising of the second lift means is advanced to the access port of the first infrared drying treatment tank. At this time, a third lift means is raised and brought to the access port of the first infrared drying treatment tank so as to receive the treatment reservoir. The third lift means which had received the treatment reservoir is lowered in the first infrared drying treatment tank and is brought to the bottom of the latter. The treatment tank is heated and treated by an infrared heater while being rotated on the third lift means in the first drying treatment tank. By this heat treatment, any solvent remaining in the silicone rubber product is volatilized and removed. Since the volatilized solvent is heavier than air, the gas gathers in the lower portion of the infrared drying tank and is cooled and recovered through a solvent recovery pipe.

The third lift means allows the treatment reservoir to be raised in the first infrared drying treatment tank and transfers it to the third feed means. The latter feeds the treatment reservoir to a starting position of the fourth feed means and places it on a fourth lift means. The latter lowers the treatment reservoir in a second infrared drying treatment tank and allows the treatment reservoir to be heated and treated by infrared irradiation as mentioned above. After treatment, the treatment reservoir is transferred by the fourth lift means to the fourth feed means.

The fourth feed means transfers the treatment reservoir to a discharge section. The treatment reservoir is discharged from the discharge section to the outside of a treatment box by means of a discharge chute. Thus, a series of treatment operations terminates for one of the treatment reservoirs containing the silicone rubber product. For a first treatment reservoir intended to terminate a series of treatment stages, the treatment time ranges from about 80–120 minutes, the treatment times range from 20–30 minutes for a treatment following the first treatment reservoir.

An infrared heater is used as a heat source for the preliminary stage and the heating temperature is preferably 200° C.

It is preferable to employ an incombustible solvent for use in the organic solvent washing treatment chamber due to use of the ultrasonic wave and the heating device. It is also desirable to use an incombustible solvent having a low or non-toxic character. Further, since the silicone rubber product immersed in the organic solvent swells and the dimethyl polysiloxane becomes very easy to extract, the organic solvent preferably is of a polar nature similar to that of the silicone rubber product (i.e., the coefficient of solvent power are preferably near each other). Silicone rubber is non-polar in nature and will not swell in an organic solvent having a positive polarity. It is thus preferable for the solvent to also be non-polar in nature. In order to judge the existence and degree of swelling, a coefficient of solvent power is used. That is, the nearer the coefficients of solvent power of the dimethyl polysiloxane and the solvent, the more easily will the polysiloxane dissolve in the solvent and swell.

Also, the boiling point of the dimethyl polysiloxane is above 100° C. but it is easy to evaporate because its vapor pressure is high. Accordingly, it is better to use an organic solvent having a boiling point as low as possible to facilitate separation by distillation and condensation. Therefore, exemplary organic solvents such as trichlorotrifluoroethane (Freon-113) are preferred. However, taking into consideration flammability, toxicity, and boiling point characteristics, other solvents which may be employed include but are not limited to carbon tetrachloride, n-hexane, 1,1,1-trichloroethane, methylene chloride and chloroform. One skilled in the art can readily determine the identity of suitable solvents given the above discussion.

An infrared heater is used as a heat source for the infrared heat treatment stage following solvent treatment and the heat treatment temperature is in the range of about 40° to 100° C. Also, the treatment time ranges from about 15 to 60 minutes though it varies in accordance with the configuration and thickness of the silicone rubber product. As a result of the infrared heating stage, the solvent remaining in the silicone rubber product may be completely volatilized and recovered.

In each of treatment stages, the treatment reservoir is preferably subjected to treatment while being rotated at a rate of from 15 to 20 revolutions per minute.

BRIEF DESCRIPTION OF THE DRAWINGS

The accompanying drawings depict an embodiment of an apparatus suitable for use in practice of the present invention:

FIG. 3 is a view depicting the operation of the wash treatment tank of the apparatus of FIG. 1;

FIGS. 6, 7 and 8 are graphical representations showing gas chromatography analyses of dimethyl siloxane with reference to the method of the present invention and the prior art method.

Figure 1:
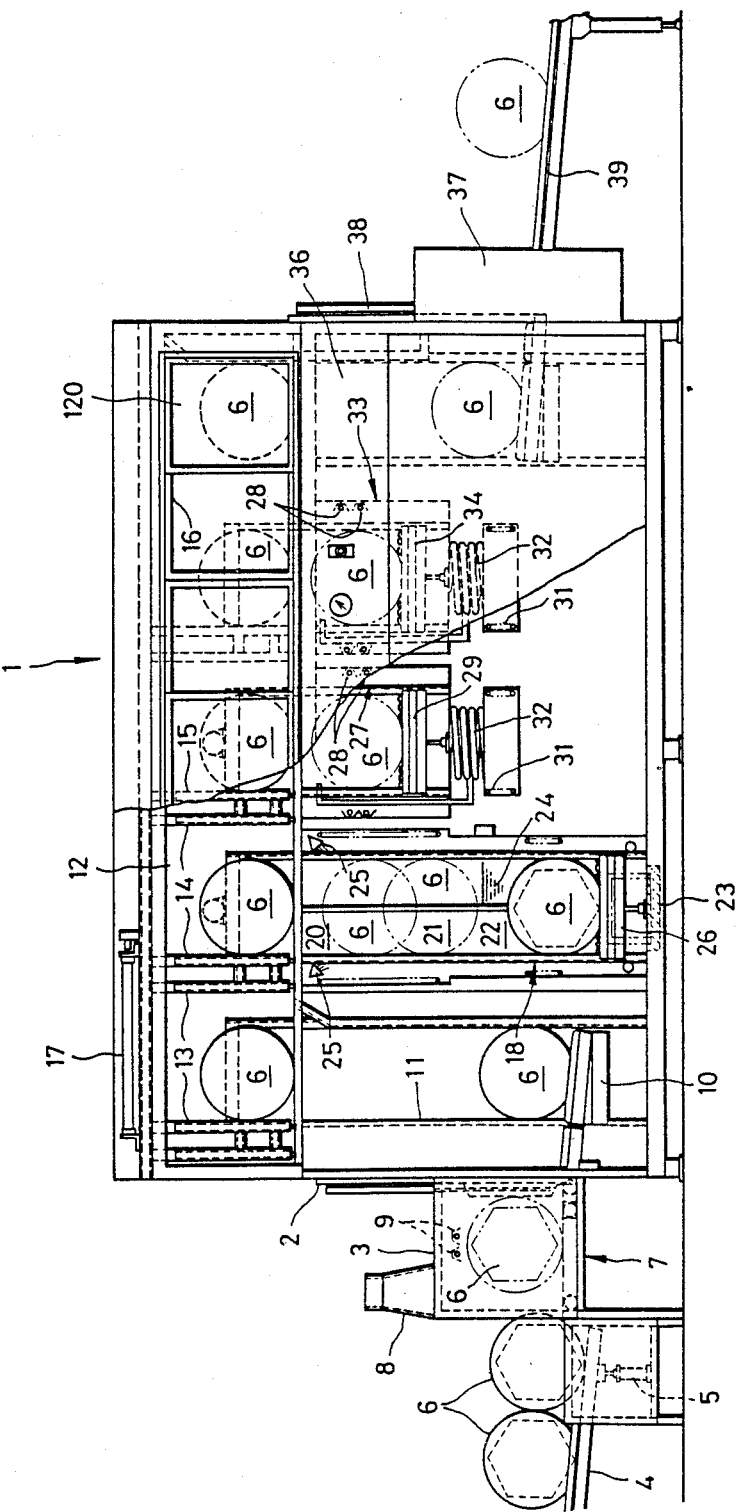
FIG. 1 is a schematic side view showing the apparatus.

An exemplary embodiment of the present invention will be described in conjunction with the Figures.

The apparatus as shown in the drawings is a preferred apparatus for use in practice of the method of the present invention but practice of the invention is of course not limited to the depicted apparatus.

FIG. 1 shows an entire treatment apparatus as a schematic side view. A treatment reservoir continuously treated in the treatment apparatus is transferred from the left to the right of the apparatus of FIG. 1 while being subjected to various treatments as described below.

In FIG. 1, reference numeral 1 shows a treatment chamber which is provided with a vertically movable inlet shutter 2. Reference numeral 3 shows a preheating chamber, the latter and the treatment chamber 1 communicating via the opening and closing of the inlet shutter 2. Reference numeral 4 comprises conveyor means (i.e., an inclined gravity conveyor) provided with lift means 5 to cause the conveyor means to be raised or lowered, such as a lifting cylinder. On the conveyor 4 is supported a treatment reservoir 6 containing a silicone rubber product to be treated, the treatment reservoir 6 being so supported until advanced into the preheating chamber 3. The lift means 5 lifts the exit end of the conveyor means 4 and accordingly advances one by one the treatment reservoirs 6 resting on the conveyor means 4 into the preheating chamber 3. Adjacent to the lifted exiting end of the conveyor means 4, a front door of the preheating chamber 3 is opened. Upon opening, the treatment reservoir 6 is easily advanced into the preheating chamber 3.

Figure 2:
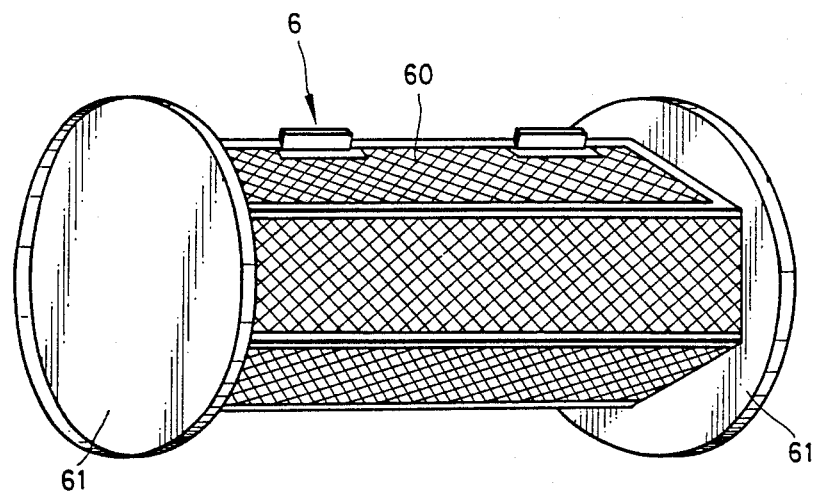
FIG. 2 is an enlarged perspective view showing a treatment reservoir.
Figure 4:
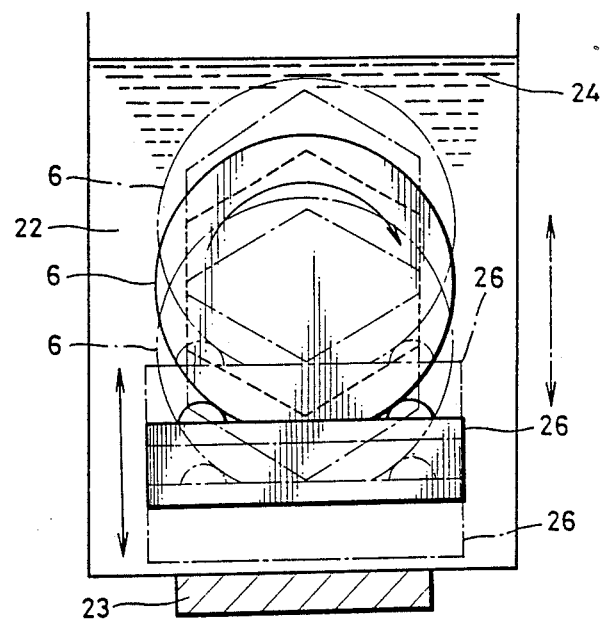
FIG. 4 is an enlarged view depicting the operation of the organic solvent wash zone of the apparatus of FIG. 1.

With regard to the treatment reservoir 6, details of which are shown in FIG. 2, a body portion is formed in a hexagonal shape from stainless material of meshes of 2 m/m 10 m/m and is provided with an access door 60 at one portion thereof. The silicone rubber product to be treated is placed in and removed from the reservoir via the access door 60. On longitudinal ends of the body portion are provided circular supporting wheel members 61 which rest on a mesh conveyor belt 7. The treatment reservoir 6 advanced into the preheating chamber 3 is supported on the mesh conveyor 7 adapted to advance by means of a 60 watt motor and the supporting wheels 61 are caused to rotate whereby the treatment reservoir is removed from the preheating chamber 3 on which an exhaust hood 8 is provided.

Reference numeral 9 comprises infrared heater means positioned near the treatment reservoir. Reference numeral 10 comprises first lift means which is vertically movable along guide means 11 is arranged in the treatment chamber 1 in a vertical direction as shown in FIG. 1. In an upper portion of the treatment chamber 1 is provided a feeder transferring passage 12 extending in a longitudinal direction. In the feeder transferring passage 12 are positioned a first feed means 13, a second feed means 14, a third feed means 15 and a fourth feed means 16 which are sequentially adjacent to each other and connected to each other by means of connector means.

The first feed means 13 is connected to a cross feed cylinder 17 which transmits power to the first feed means 13. The latter allows the second feed means 14, the third feed means 15 and the fourth feed means 16 to reciprocate simultaneously in left and right lateral directions. The first feed means 13 is displaced from its starting position to the starting position of the second feed means 14. The latter is displaced from the starting position thereof to the starting position of the third feed means 15. The latter is displaced from the starting position thereof to the starting position of the fourth feed means 16. The latter is displaced the starting position thereof to a discharge position 120.

Reference numeral 18 comprises a wash treatment tank which is arranged in a vertical direction of the treatment chamber 1. In an access port formed on an upper end of the wash treatment tank is mounted cover 19 (FIG. 3) capable of being opened and closed. The cover 19 is opened when the treatment reservoir 6 is advanced through the access port of the wash treatment tank 18. The access port is closed when such advancement is completed. A port at the top of tank 18 operates to let reservoir 6 descend into tank 18 and thereafter closes. In the wash treatment tank 18 is positioned a second lift means 26 capable of vertical reciprocating movement. In the wash treatment tank 18 are provided a dry air treatment zone 20, a shower and vapor washing zone 21 and an organic solvent washing zone 22 vertically aligned from the upper portion to the lower portion thereof. A solvent 24 is provided in the organic solvent washing zone 22. Air nozzles 25 are provided in the dry air treatment zone 20. A spraying pipe is provided in the shower and vapor washing zone 21. The lift. 26 is moved vertically by means of a motor (not shown) and is provided with additional motor means which rotates the treatment reservoir 6 on the second lift 26.

Figure 5:
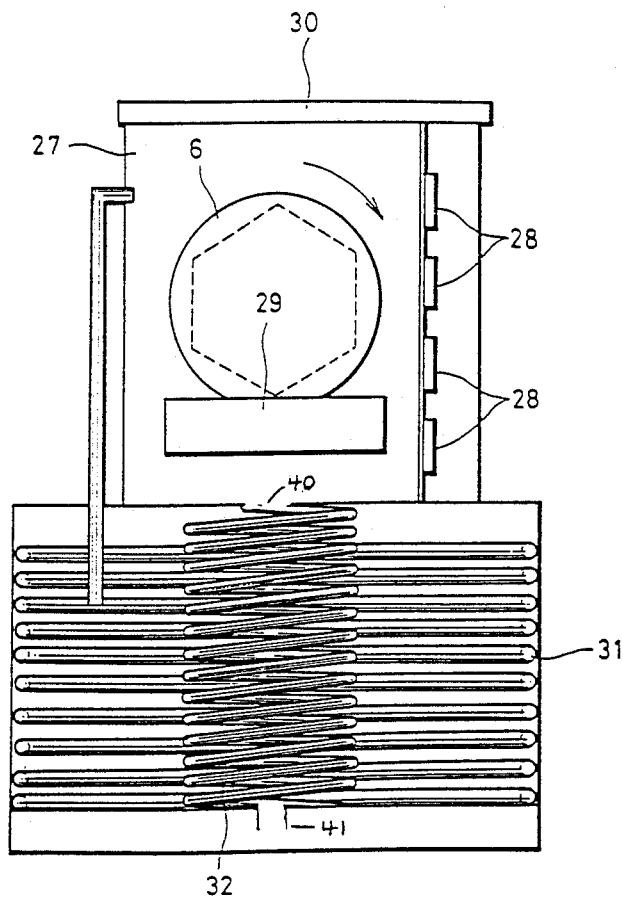
FIG. 5 is an enlarged view depicting the first infrared heating treatment chamber of the apparatus of FIG. 1.

Reference numeral 27 comprises a first infrared treatment chamber formed of a heat resistant glass cylinder. In the first infrared heating treatment chamber 27 are arranged infrared heaters 28 (see also FIG. 5). A third lift means 29 is provided capable of reciprocating vertical movement. The treatment reservoir 6 is placed on the third lift means 29 and rotated in the same manner as mentioned above. An access port for the first infrared heating treatment tank 27 is provided capable of being opened and closed. The access port is opened when the third lift 29 rises to receive the treatment reservoir 6 transferred by the second feed means 14. After receiving the treatment reservoir 6, the third lift 29 drops into the first infrared heating treatment chamber 27 and the access port is closed by means of a suitable cover 30.

In the first infrared heating treatment chamber 27 is mounted a solvent collecting pipe 32 arranged in a spiral shape surrounded by a cooling coil 31. The solvent which is collected through the solvent collecting pipe 32 is recirculated in the organic solvent washing zone 22.

In the coil 31, cooling water circulates which is maintained at a suitable temperature (preferably below 7° C. via a chiller) in order to maintain the tank 27 at the desired temperature. The specific gravity of the organic solvent gas generated in the first infrared heating tank 27 is heavier than air. The gas thus collects in the lower portion of the tank 27. The gas subsequently enters pipe 32 to be cooled at inlet 40, condensed and collected for transport via an outlet 41 for further use.

Specifically, liquid organic solvent recovered from pipe 32 is passed to distillation and condensation apparatus (not shown) in treatment chamber 1 having the capacity to replace up to 5 times the organic solvent 24 contained in wash chamber 22.

Fresh organic solvent always enters the wash chamber 22 via the distillation and condensation means (not shown). Simultaneously, the organic solvent containing a small amount of dimethylpolysiloxane passes to the distillation and condensation means by overflow from the wash chamber 22. In order to separate the organic solvent (for example, in the case of Freon-113) and the dimethylpolysiloxane by utilization of the respective differences in boiling points, a distillation temperature in the range of 50°–55° C. is employed.

When the temperature of the distillation means exceeds the boiling point of the solvent, such indicates that the content of dimethyl polysiloxane has increased. At that time, all organic solvent containing the polysiloxane in the distillation and condensation means is discharged as waste.

Reference numeral 33 comprises a second infrared heating treatment chamber consisting of a heat resistant glass cylinder containing infrared heaters 28. In the second infrared heating treatment chamber 33 is provided a fourth lift means 34 capable of reciprocating vertical movement. On the fourth lift means 34 is supported the treatment reservoir 6 which is rotated in the same manner as that mentioned above. On an access port of the second infrared heating treatment chamber 33 is mounted a cover (not shown) in the same manner as that mentioned above capable of opening and closing.

The cover is opened when the fourth lift 34 rises to receive the treatment reservoir 6. After receiving the treatment reservoir 6, the fourth lift means 34 is lowered in the second infrared heating treatment chamber 33 and the cover closed. In the second infrared heating treatment chamber 33 is mounted a solvent collecting pipe 32 arranged in a spiral shape within a cooling coil 31. The solvent which is collected through the solvent collecting pipe 32 is recirculated in the organic solvent washing chamber 22 in the same manner described above.

Reference numeral 120 comprises a discharge section to which the treatment reservoir is transferred by the fourth feed means after having completed a treatment to reduce the amount of dimethyl polysiloxane. The treatment reservoir 6 transferred to the discharge section 120 is transferred to a discharge chute 36 and further, to an output conveyor means 39 by opening an outlet shutter 38 in outlet means 37.

In order to reduce the amount of dimethyl polysiloxane remaining in the silicon rubber product to the ultramicro level, the following treatment steps are performed.

By opening the access cover 60, the treatment reservoir 6 may receive the silicone rubber product to be treated in an amount up to about ⅓ of the inner volume thereof.

The treatment reservoir 6 is placed on the conveyor means 4 and is caused to advance in the preheating chamber 3 by means of the lift means 5. The treatment reservoir is heated and treated by infrared irradiation in the preheating chamber 3. The silicone rubber product in the treatment reservoir 6 is heated and uniformly subjected to irradiation as a result of rotation of the reservoir. In this way, it is possible to remove most of the low boiling dimethyl polysiloxane remaining in the silicone rubber product, whereby 80–90% of the total amount of the dimethyl polysiloxane is removed. The silicone rubber product is preferably heated to a temperature in the range of about 180
pretreatment step.

The treatment reservoir 6, upon termination of the preliminary treatment step, is allowed to advance from the preheating chamber 3 into the treatment chamber 1 by opening the shutter 2, and is lifted from the lower portion to the upper portion of the treatment chamber 1 by means of the first lift means 10; and further, is transferred to the first feed means 13. The latter and the treatment reservoir 6 are transferred to the access port of the wash treatment tank 18 by means of the cross feed cylinder 17. At this time, the second lift means 26 which reciprocates vertically in the wash treatment tank 18 is lifted to receive the treatment reservoir 6 being transferred thereto.

Subsequently, the second feed means 14 is transferred to the access port of the first infrared heating treatment tank 27 whereby the treatment reservoir is treated in the treatment tank 27. Similarly, the third feed means 15 is transferred to the access port of the second infrared heating treatment tank 33 whereby the treatment reservoir is treated in the treatment tank 33. Further, the fourth feed means 16 is transferred to the discharge section 120. The first to the fourth feed means 13, 14, 15 and 16 are reciprocated simultaneously by action of the cross feed cylinder 17.

When the second lift means 26 receives the transferred treatment reservoir 6 at the access port of the wash treatment tank 18, the second lift means 26 is lowered in the wash treatment tank 18 and the treatment reservoir 6 is transferred to the ultrasonic washing zone 22 provided in the lowermost portion of the wash treatment tank 18. At this time, the treatment reservoir 6 supported on the second lift 26 is fully immersed in the organic solvent 24 in the ultrasonic washing zone 22. The immersed treatment reservoir 6 is rotated on the second lift 26 by means of a rotary mechanism and is vertically reciprocated in the organic solvent 24 by vertical reciprocation means. At this time, the ultrasonic wave energy (25-100 KHz) is applied to the organic solvent 24 by means of the ultrasonic oscillator 23 provided in the ultrasonic washing zone 22. As a result, an infinite number of ultra fine cavitation bubbles are generated in the solvent. Cavitation bubbles are formed by oscillation due to the use of both multiple and high frequencies whereby residual substances and deposits are destroyed and refined. Acceleration of molecular vibration in the solvent becomes greater and the cavitation proceeds with variation between a high vacuum and a high pressure.

Also, the organic solvent and the silicone rubber product are uniformly treated due to the rotation and vertical movement in the treatment reservoir. Accordingly, direct contact is avoided between adjacent silicone rubber products and between the latter and the treatment reservoir. When the silicone rubber product is immersed in the organic solvent, after about 4-5 minutes it becomes swollen to a cubic volume three times that exhibited before immersion. If the aforementioned rotation and vertical movement are applied to such a swollen silicone rubber product, an infinite number of ultra-fine cavitation bubbles are caused to advance more efficiently within the product. As a result, the dimethyl polysiloxane remaining in the silicone rubber product is extracted by action of the organic solvent over a short time and at high efficiency. Treatment temperatures in the range of from about 25° to 43° C. are generally employed as well as treatment times in the range of 10 to 60 minutes.

By raising the second lift means 26, the treatment reservoir 6 is removed from the organic solvent 24. Then, the treatment reservoir 6 is transferred to the shower and vapor washing zone 21 and subjected to shower and vapor washing. The sprayed vapor is substantially allowed to evaporate.

The second lift means 26 is further raised to the wash treatment zone. The treatment reservoir 6 is transferred into the dry air treatment zone 20 whereby dry air is forced through the air nozzle 25. During the aforesaid treatment stage, the treatment reservoir 6 is treated while being rotated on the second lift means 26. At this time, the second feed means 14 is brought to the access port of the wash treatment tank 18. Then, the treatment reservoir 6 is transferred to the second feed means 14 by raising the second lift means 26 to the access port of the first infrared heating treatment tank 27 to be shifted horizontally by the second feed means 14. At this time, the third lift means 29 is raised and brought to the access port of the first infrared heating treatment chamber 27 to receive the aforesaid treatment reservoir 6. The third lift means 29 which receives the treatment reservoir 6 drops in the first infrared heating treatment tank 27 and is lowered to the bottom of the first infrared heating treatment chamber 27. The treatment reservoir 6 is heated and treated by the infrared heating means 28 while being rotated on the third lift means 29 in the first infrared heat treatment chamber 27. By this heat treatment, the solvent remaining in the silicone rubber product is volatilized and removed. Since the specific gravity of the gas of the volatilized solvent is heavier than air, the gas gathers in the lower portion of the infrared heat treatment tank and is cooled, condensed and collected through the solvent collecting pipe 32. Treatment temperatures ranging from about 40° to 100° C. and treatment times ranging from 20 to 60 minutes are generally employed.

The third lift means 29 is subsequently raised in the first infrared heat treatment chamber 27 and transfers the treatment reservoir 6 from the access port of the first infrared heating treatment chamber 27 for transfer to the third feed means 15. The latter advances the treatment reservoir 6 to a starting position of the fourth feed means 16 and sets it on the fourth lift means 34. The latter is lowered in the second infrared heating treatment chamber 33 and allows the treatment reservoir 6 to be heated and treated by the infrared heating means 28 in the same manner as mentioned above.

After treatment, the fourth lift means 34 is raised in the second infrared heating treatment tank 33, and the treatment reservoir 6 is transferred from the access port of the second infrared heating treatment chamber 33 to the fourth feed means 16. The latter transfers the treatment reservoir 6 to the discharge section 120. The treatment reservoir 6 is conducted from the discharge section 120 through the discharge chute 36 and from the outlet shutter to the outside of the treatment chamber 1. Thus, a series of the treatment operations terminates for the treatment reservoir containing the silicone rubber product.

The first treatment reservoir generally passes through the series of treatment operations over a period of about 80-120 minutes, but successive treatments may occur over periods of 20-30 minutes for subsequently treated treatment reservoirs.

In order to confirm the advantages provided by the present invention, the following experiments were performed.

Table 1 shows the results of quantitative analysis using a gas chromatograpy of the dimethyl polysiloxane remaining subsequent to practice of the method according to the present invention, a vacuum drying method and a hot air circulating method.

TABLE 1

| | Remaining Amount of Siloxane | |
|---|---|---|
| Second Vulcanization | Dimethyl Polysiloxane (ppm) | Total Dimethyl Polysiloxane (ppm) |
| No second vulcanization | 13,991.64 | 29,726.60 |
| Vacuum Drying (<10 mmHg) | | |
| 200° C. × 1 hr | 21.61 | 847.08 |
| 200° C. × 2 hr | 12.56 | 621.09 |
| 200° C. × 3 hr | 5.83 | 562.50 |
| 200° C. × 4 hr | 5.00 | 485.63 |
| 220° C. × 0.5 hr | 35.08 | 855.90 |
| 220° C. × 1 hr | 10.44 | 715.30 |
| 220° C. × 1.5 hr | 7.96 | 583.75 |
| 220° C. × 2 hr | 6.81 | 424.42 |
| 220° C. × 3 hr | 5.52 | 417.95 |
| 220° C. × 4 hr | 3.54 | 223.25 |
| 220° C. × 6 hr | 6.47 | 221.39 |
| 220° C. × 8 hr | 8.62 | 216.89 |
| Hot Air Circulation (oven) | | |
| 200° C. × 24 hr | 5.01 | 395.10 |
| The present | 1.83 | 2.06 |

TABLE 1-continued

| | Remaining Amount of Siloxane | |
|---|---|---|
| Second Vulcanization | Dimethyl Polysiloxane (ppm) | Total Dimethyl Polysiloxane (ppm) |
| invention | | |

Dimethyl polysiloxane = $[(CH_3)_2 SiO]_{3-25}$

Figure 6:
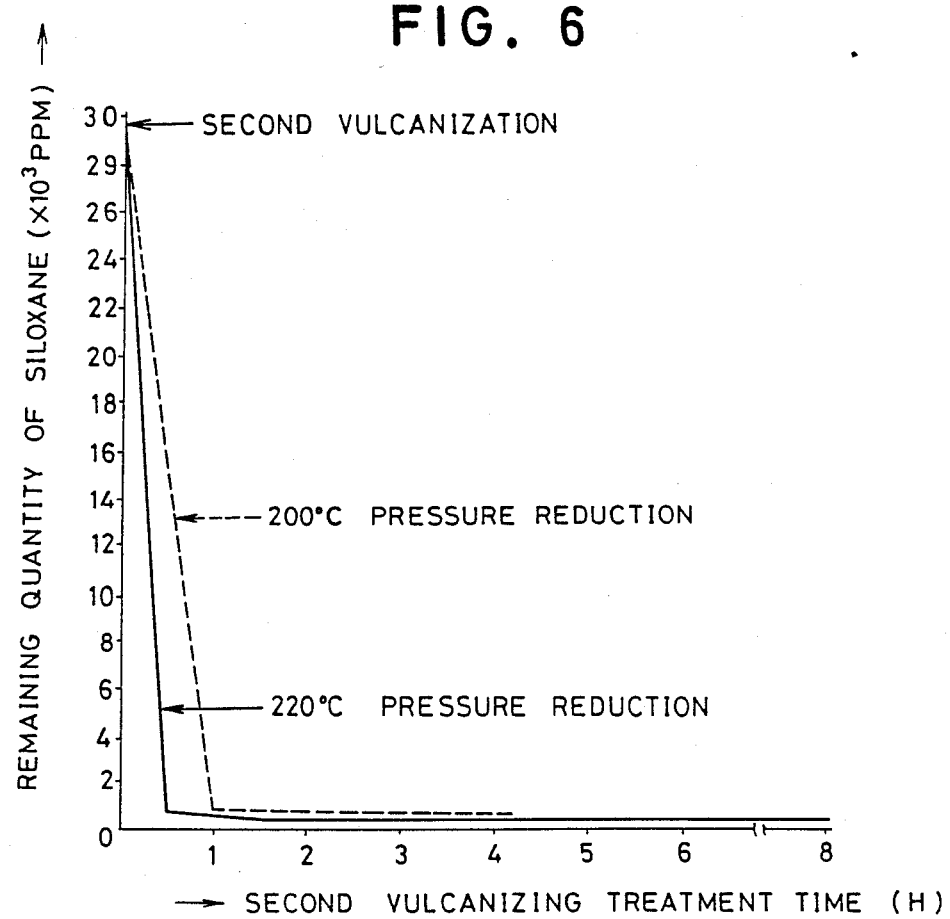

Table 1 demonstrates that dimethyl polysiloxane may be detected in quantities of nearly 30,000 ppm by means of quantitative analysis using gas chromatography in the case where a second vulcanization treatment is not performed. However, by performing the second vulcanization treatment, the dimethyl polysiloxane is rapidly and almost totally removed. Such results are shown in FIG. 6.

However, when the level which is less than the detection limit in the prior system is microscopically present in an amount less than 1000 ppm as confirmed by use of a gas chromatography analyzer G-3800 (made by Yanagimoto Seisakusho), it can be confirmed that a clear difference exists between quantities of the remaining dimethyl polysiloxane as shown in FIG. 7. By use of the second vulcanizing treatment according to the prior art, it is impossible to reduce the dimethyl polysiloxane remaining in the silicone rubber product to the ultramicro level.

The levels attained, for example, at 200° C.×4 hours and 200° C.×24 hours in the treatment using the hot air oven (hot air circulating type at constant temperature) being generally performed in the prior art can be duplicated at 200° C.×1 hour and 220° C.×over 3 hours when employing a heating and pressure reducing system. Therefore, it can be confirmed that heating and pressure reduction are preferable to heating alone.

However, as shown in FIG. 8, when attention is directed to $[(CH_3)_2 SiO]_{3-25}$ having a relatively low molecular weight, the heating and pressure reduction treatment at 220° C. for more than 4 hours results in cracking (thermal decomposition), whereby it can be concluded that the amount of dimethyl polysiloxane has a tendancy to increase. Therefore, the balanced state of FIG. 7 is a limit beyond which dimethyl polysiloxane cannot be further removed by heating.

By means of the present invention, it is possible to reduce the level of dimethyl polysiloxane to an ultramicro level which is about 1/100 of the level capable of being attained in the prior hot air circulating type of constant temperature chamber and the heating and pressure reduction method.

It has been confirmed by gas chromatography that the solvent does not remain in the treated product. The solvent (trichloro-trifluoroethane) is one which may be used for the treatment removing the dimethyl polysiloxane in the liquid washing method according to the present invention. The results are shown in FIGS. 9 and 10.

A 1.0 gram polysiloxane product provided after washing with a liquid was immersed in n-undecane. After stirring for a specified time, the remaining solvent was admixed in the n-undecane and it was used as a sample for gas chromatography analysis.

Figure 10:
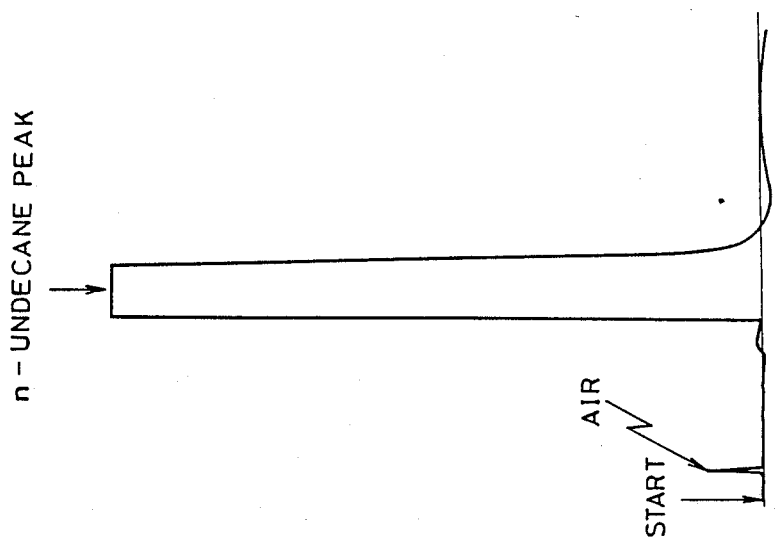
FIGS. 9 and 10 are graphical representations showing gas chromatography analyses for confirming the presence of a treatment solvent remaining after treatment.
Figure 9:
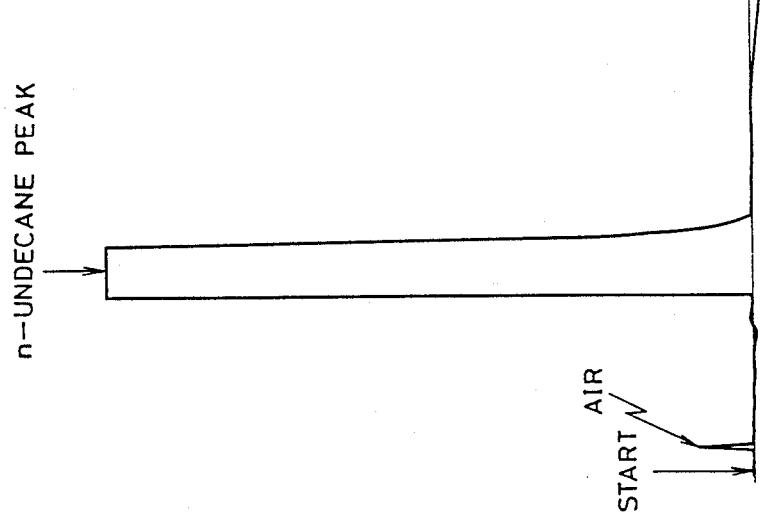

As apparent from FIGS. 9 and 10, the treated product which had been treated by ultrasonic treatment in the organic solvent has the same peak as the peak of the extracted solvent.

If the treatment solvent remains in the product, the peak is detected a few seconds after beginning the chart (before the air peak).

If the peak is not confirmed until the air peak after injecting the sample, it can be stated that the solvent does not remain in the product treated by the liquid washing method.

The detailed description set forth is the preferred embodiment of the method of the present invention. However, certain changes may be made in carrying out the above method without departing from the scope of the invention; it is therefore intended that all matter contained in the above description shall be interpreted as illustrative and not in a limited sense. It is also to be understood that the following claims are intended to cover all of the generic and specific features of the invention herein described, and all statements of the scope of the invention, which as a matter of language, might be said to fall therebetween.

What is claimed is:

1. A method of reducing the level of $[(CH_3)_2SiO]_{3-25}$ remaining as an impurity and a silicone rubber product containing said $[(CH_3)_2SiO]_{3-25}$, comprising the steps of immersing said silicone rubber product in an organic liquid which is a solvent for said $[(CH_3)_2SiO]_{3-25}$ but not for said rubber, subjecting the immersed product to ultrasonic vibrations in said organic solvent, and removing the immersed product from contact with said solvent.

2. The method of claim 1, wherein said silicone rubber product is confined in a treatment reservoir during said ultrasonic treatment.

3. The method of claim 2, wherein said treatment reservoir is comprised of a mesh material.

4. The method of claim 2, wherein said treatment reservoir is hexagonal in shape and includes an opening for access to the interior of the reservoir together with means to close the opening.

5. The method of claim 2, wherein said treatment reservoir containing said silicone rubber product is rotated and subjected to reciprocating vertical movement while immersed in said organic solvent during said ultrasonic treatment.

6. The method of claim 1, wherein said silicone rubber product is subjected to infrared irradiation subsequent to removing said product from contact with said solvent thereby to remove residual solvent therefrom.

7. The method of claim 1, wherein said organic solvent is trichlorotrifluoroethane.

8. The method of claim 1, wherein said treatment in said organic solvent occurs at a temperature in the range of about 25° to 43° C.

9. The method of claim 1, wherein said silicone rubber product is treated in said organic solvent for a period of time ranging from about 10 to 60 minutes.

10. The method of claim 1, wherein said ultrasonic vibrations have frequencies ranging between 25 and 100 KHz.

11. The method of claim 6, wherein the treatment temperature ranges from about 40° to 100° C. during said infrared heating treatment.

12. The method of claim 6, wherein said infrared treatment occurs over a period of time between 20 and 60 minutes.

13. The method of claim 2, wherein said treatment reservoir containing said silicone rubber product is preheated by means of infrared irradiation prior to contact with said solvent.

14. The method of claim 13, wherein the temperature during said preheating step ranges from about 180° to 200° C.

15. The method of claim 1, wherein said silicone rubber product subsequent to treatment with said solvent is washed with a further quantity of said organic solvent and dried with air.

16. The method of claim 15, wherein said silicone rubber product is dried with air for a period of 10 minutes.

17. The method of claim 1, wherein said organic solvent is selected from the group consisting of carbon tetrachloride, n-hexane, 1,1,1-trichloroethane, methylene chloride, chloroform and trichlorotrifluoroethane.

18. The method of claim 6, wherein said silicone rubber product is subjected to multiple infrared irradiation treatments to remove residual solvent therefrom.

19. The method of claim 18, wherein residual solvent removed from said product by said infrared irradiation treatments is recovered for use in said solvent treatment step.

* * * * *